March 25, 1952  McKINLEY TAYLOR  2,590,583
PISTON TYPE, DIFFERENTIAL PRESSURE
GAUGE FOR RATE OF FLOW INDICATORS
Filed Jan. 25, 1949  2 SHEETS—SHEET 1

INVENTOR.
McKinley Taylor,
BY Victor J. Evans & Co.
ATTORNEYS

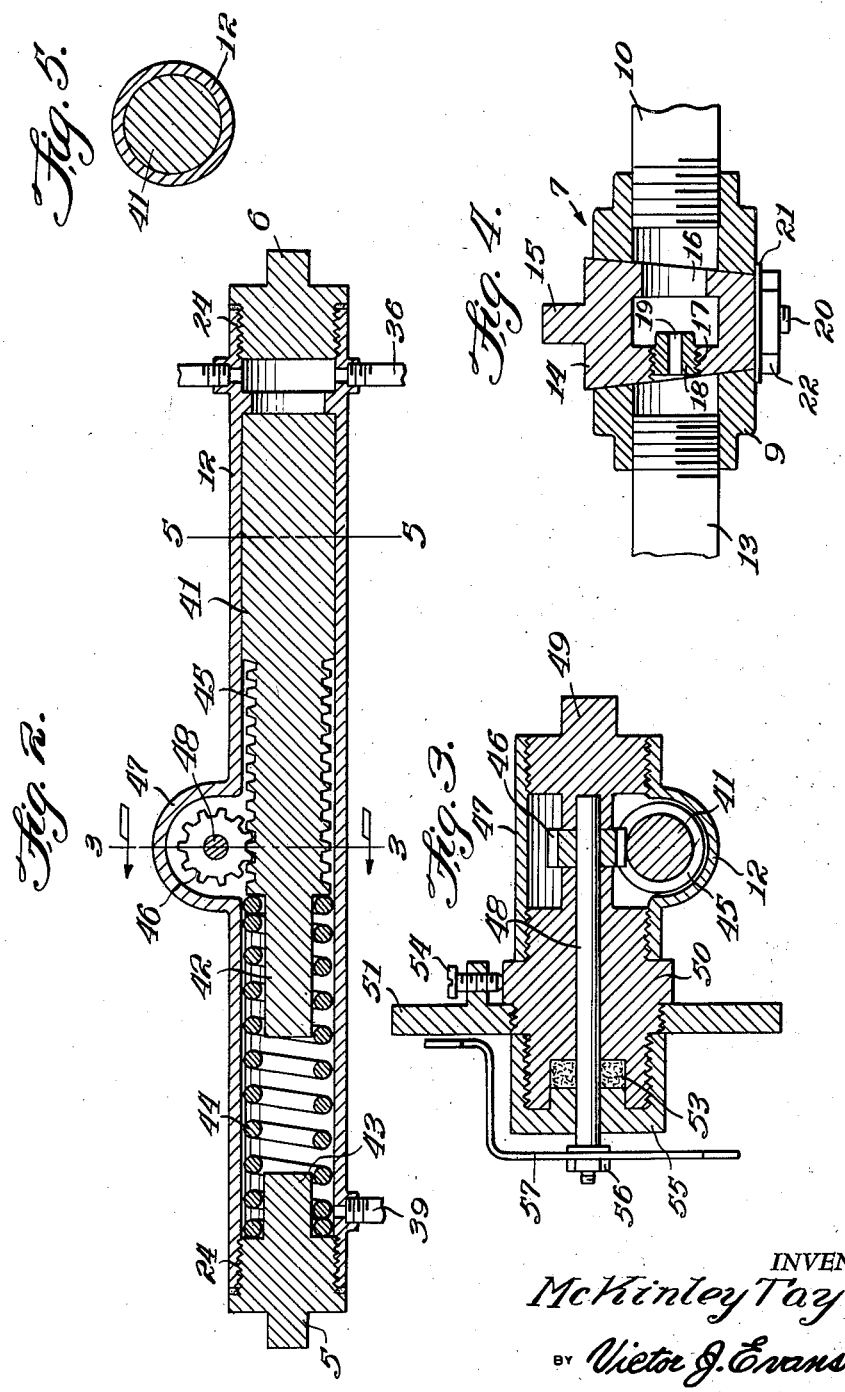

Patented Mar. 25, 1952

2,590,583

UNITED STATES PATENT OFFICE 2,590,583

PISTON TYPE DIFFERENTIAL PRESSURE GAUGE FOR RATE OF FLOW INDICATORS

McKinley Taylor, Iraan, Tex.

Application January 25, 1949, Serial No. 72,611

1 Claim. (Cl. 73—419)

This invention relates to an indicator, and more particularly to a device for indicating the rate of flow of crude oil from a producing well.

The object of the invention is to provide a device which will accurately indicate the amount of crude oil flowing from a producing well, the indicating device of the present invention enabling the operator to accurately control the amount of crude oil flowing from a well.

Another object of the invention is to provide a rate of flow indicator which is extremely simple and inexpensive to manufacture.

Other objects of the invention will become apparent as the description proceeds and when taken in conjunction with the drawings in which:

Figure 2 is a central longitudinal sectional view of the cylinder and plunger;

Figure 3 is a sectional view taken on the line 3—3 of Figure 2;

Figure 4 is a central longitudinal sectional view of the stop valve; and

Figure 5 is a sectional view taken on the line 5—5 of Figure 2.

Figure 1:
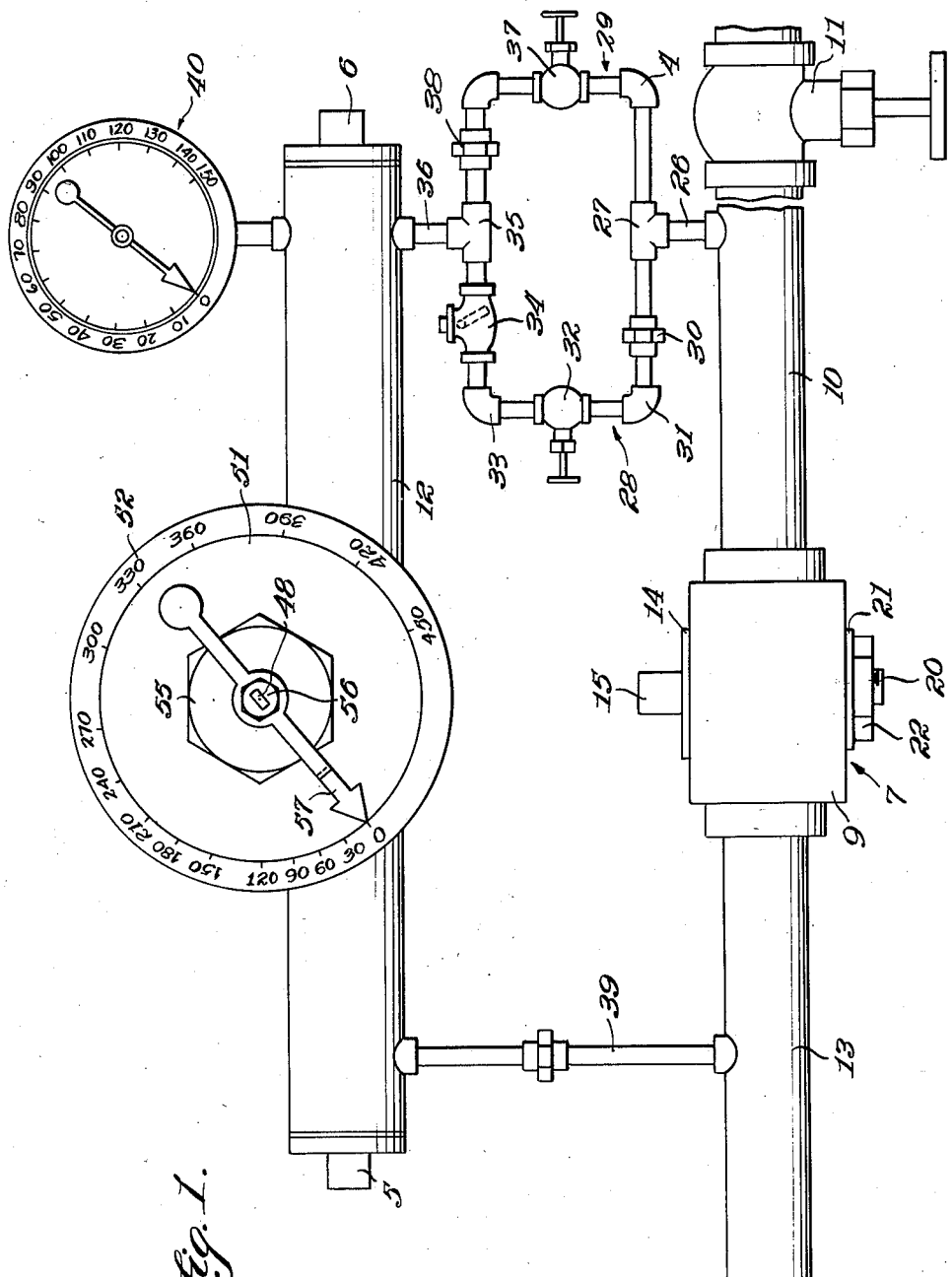
Figure 1 is an elevational view of the rate of flow indicator, according to the present invention.

Referring in detail to the drawings, the numeral 10 designates a portion of a line for conveying crude oil from a producing well. Interposed in the line or pipe 10 is a manually controlled valve 11 for varying the quantity of oil flowing therethrough. A valve mechanism 7 is threadably connected to the end of the pipe 10 and to a second pipe or conduit 13. The valve 7, Figures 1 and 4, embodies a housing 9 provided with a rotatable core 14 therein. The core has a projecting square shank 15 for rotating the core 14. The core 14 is bored as at 16 and is also provided with a threaded bore 17 for receiving an exteriorly threaded jet member 18. The jet member is apertured as at 19 and the size of the aperture 19 may be varied by disassembling the valve 7 and inserting a jet member having the desired sized aperture. The core 14 is also provided with a threaded end 20, there being a washer 21 and nut 22 circumposed on the end 20 for maintaining the parts of the valve in assembled relation.

Arranged in spaced relation with respect to the pipes 10 and 13 is a cylinder 12 having its opposite ends threaded interiorly as at 24 for receiving therein plugs 5 and 6. A conduit 26 has one end connected to the pipe 10 and its other end connected to a T-fitting 27 and leading from the fitting 27 is a pair of tubular sections 28 and 29. The tubular section 28 is provided with a union 30, elbow 31, manually operable gate valve 32, elbow 33, and a check valve 34, and finally the tubular section 28 terminates in a T-fitting 35 which is connected to a conduit 36 that is in communication with one end of the cylinder 12. The tubular section 29 extends from the other side of the T-fitting 27 and is provided with an elbow 4, manually operable gate valve 37, union 38, and finally the tubular section terminates in the T-fitting 35, and these tubular sections are for a purpose to be later described. The other end of the cylinder 12 is connected by a conduit 39 to the pipe 13, Figure 1.

Arranged in communication with the interior of the cylinder 12 is a gauge 40 for indicating pressure in the cylinder.

Slidably arranged in the cylinder 12 is a piston or plunger 41 having one end 42 of a reduced diameter, Figure 2, and this end abuts a nose 43 which projects from the closure plug 5 to limit movement of the plug 41 towards the plunger 5. A coil spring 44 is arranged in the cylinder 12 and is circumposed on the end 42 and on the nose 43 for normally urging the plunger 41 away from the plug 5.

The plunger 41 is milled for a portion of its length to define gear teeth 45 which are arranged in meshing engagement with a gear 46 that is rotatably positioned in a housing 47 which is formed integral with the cylinder 12 intermediate its ends. The gear 46 is secured to an end of a rotatable shaft 48, Figures 2 and 3. The shaft 48 projects into a closure cap 49 which is arranged in threaded engagement with one end of the housing 47 and the shaft 48 is supported by a bearing block 50. A circular dial 51 is threaded on a portion of the block 50 and releasably secured thereto by a set screw 54. The dial 51 is provided with markings 52 thereon to indicate the rate of flow of oil through the pipes 10 and 13. Suitable packing 53 is arranged around the shaft 48 and a packing gland nut 55 holds the packing 53 in place. Secured to the projecting end of the shaft 48 by a nut 56 is a hand 57 for coacting with markings 52 on the dial 51 to indicate the rate of flow.

In use, crude oil flows from a producing well through the pipe 10, the valve 11 providing a means for adjusting the flow of oil therethrough. The gate valve 37 is first opened so that oil will flow through the tubular section 29 and into the cylinder 12 to thereby move the plunger 41. This movement causes the shaft 48 to rotate so that the hand 57 will move to indicate the rate of flow of oil from the well. The dial 51 is preferably calibrated to read in barrels of oil per twenty-four hours. The pressure gauge 40 provides a pressure reading for the operator. The oil flowing through the pipe 10 passes through the aperture 19 in the valve 7 and out through the pipe 13 to the locality desired. The tubular section 28 is used as follows: After the valve 37 is opened, the gate valve 32 is then opened, and the gate valve 37 is then closed so that there will be less fluctuation of the dial hand 57, since the check valve 34 is arranged in the tubular section 28. The gate valve 32 need only be kept open until the valve 11 has been adjusted in order to get the desired flow of oil, and the gate valve 32 may then be closed, and only opened as needed. The check valve 34 is conventional and fluid flows from left to right, Figure 1, through the check valve 34.

From the foregoing, it is apparent that a device has been provided which will indicate the true amount of oil flowing from wells, and which will enable the operator to accurately control the flow of oil from the producing well.

While I have shown and described a preferred form of the device, this is by way of illustration only and I consider as my own all such modifications in construction as fairly fall within the scope of the appended claim.

What I claim is:

An indicating device comprising a cylinder, the opposite ends of said cylinder being threaded interiorly, a plug arranged in threaded engagement with each end of said cylinder, a nose projecting inwardly from one of said plugs, a plunger slidably arranged in said cylinder and having one end of reduced diameter for engagement with said nose, a coil spring circumposed on the reduced end of said plunger and on said nose, a plurality of gear teeth arranged on said plunger, a housing arranged intermediate the ends of said cylinder and projecting therefrom, and a gear rotatably positioned in said housing and meshing with said gear teeth for operating an indicator, said cylinder being provided with means at either end, on opposite sides of the plunger, for transmitting fluid pressure thereto.

McKINLEY TAYLOR.

REFERENCES CITED

The following references are of record in the file of this patent:

UNITED STATES PATENTS

| Number | Name | Date |
|---|---|---|
| 1,068,280 | Simpson et al. | July 22, 1913 |
| 1,107,298 | Haas | Aug. 18, 1914 |
| 1,454,222 | Palmer et al. | May 8, 1923 |
| 1,682,602 | Dawley | Aug. 28, 1928 |
| 1,943,993 | Stewart et al. | Jan. 16, 1934 |
| 1,995,490 | Wilkinson | Mar. 26, 1935 |
| 2,210,081 | Humphrey | Aug. 6, 1940 |
| 2,449,556 | Kirkley | Sept. 21, 1948 |

FOREIGN PATENTS

| Number | Country | Date |
|---|---|---|
| 506,915 | France | June 9, 1920 |
| 555,278 | France | Mar. 19, 1923 |